US012440994B1

(12) United States Patent
Wang et al.

(10) Patent No.: US 12,440,994 B1
(45) Date of Patent: Oct. 14, 2025

(54) AUTONOMOUS ROBOTIC PACK PLANNING SYSTEMS AND METHODS FOR ITEM STABILITY AND INTEGRITY

(71) Applicant: Amazon Technologies, Inc., Seattle, WA (US)

(72) Inventors: Fan Wang, Woburn, MA (US); Jane Shi, Tewksbury, MA (US)

(73) Assignee: Amazon Technologies, Inc., Seattle, WA (US)

( * ) Notice: Subject to any disclaimer, the term of this patent is extended or adjusted under 35 U.S.C. 154(b) by 1011 days.

(21) Appl. No.: 17/521,137

(22) Filed: Nov. 8, 2021

(51) Int. Cl.
*B25J 9/16* (2006.01)
*B65B 35/50* (2006.01)
*B65B 57/10* (2006.01)
*G05B 19/402* (2006.01)

(52) U.S. Cl.
CPC ............. *B25J 9/1687* (2013.01); *B25J 9/163* (2013.01); *B25J 9/1661* (2013.01); *B25J 9/1671* (2013.01); *B65B 35/50* (2013.01); *B65B 57/10* (2013.01); *G05B 19/402* (2013.01); *G05B 2219/39001* (2013.01)

(58) Field of Classification Search
CPC ........ B25J 9/1687; B25J 9/163; B25J 9/1661; B25J 9/1671; B65B 35/50; B65B 57/10; G05B 19/402; G05B 2219/39001
See application file for complete search history.

(56) References Cited

U.S. PATENT DOCUMENTS

| | | | |
|---|---|---|---|
| 8,615,386 B2 * | 12/2013 | Baldes | B65G 57/00 703/7 |
| 10,329,042 B2 * | 6/2019 | Nammoto | B65B 5/06 |
| 10,549,928 B1 * | 2/2020 | Chavez | B65G 47/905 |
| 10,647,528 B1 * | 5/2020 | Diankov | B65G 47/90 |
| 2007/0280812 A1 * | 12/2007 | Morency | B65G 61/00 414/729 |
| 2022/0016779 A1 * | 1/2022 | Wang | G06T 7/50 |
| 2022/0402710 A1 * | 12/2022 | Pidaparthi | B65G 57/03 |

* cited by examiner

Primary Examiner — Thomas Randazzo
(74) Attorney, Agent, or Firm — Athorus, PLLC

(57) ABSTRACT

Autonomous robotic pack planning systems and methods may include an item identification subsystem, a pack planning subsystem, and a robotic packing subsystem. Based on identified items to be packed, the pack planning subsystem may generate a pack plan with placement poses for items that satisfy various constraints, including containment constraints, stability constraints, and/or stress constraints. Then, the robotic packing subsystem may pack the items according to the pack plan. Further, packing of items may be monitored in real-time, and the pack plan may be dynamically adjusted or regenerated in response to deviations from the pack plan.

20 Claims, 7 Drawing Sheets

AUTONOMOUS ROBOTIC PACK PLANNING SYSTEMS AND METHODS FOR ITEM STABILITY AND INTEGRITY

BACKGROUND

Many companies may store, package, and ship items and/or groups of items from material handling facilities. For example, many companies may store items in a material handling facility and ship items to various destinations (e.g., customers, stores) from the material handling facility. Various material handling systems and processes may pack items based on item geometries. However, such conventional packing systems and processes fail to consider other item attributes, such as item stability and/or item integrity. Accordingly, there is a need for safe, reliable, and efficient automated systems and methods to pack items within containers, while ensuring stability and integrity of the packed items.

DETAILED DESCRIPTION

Figure 1:
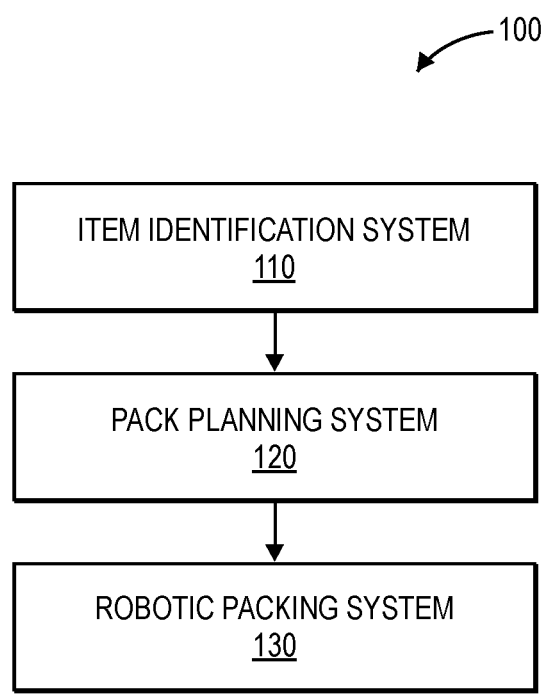
FIG. 1 is a block diagram of an example autonomous robotic pack planning system, in accordance with implementations of the present disclosure.

As is set forth in greater detail below, implementations of the present disclosure are directed to autonomous robotic pack planning systems and methods that may include item identification subsystems, pack planning subsystems, and robotic packing subsystems. The autonomous robotic pack planning systems and methods described herein may generate and execute pack plans to pack a plurality of items into one or more containers that consider item stability, e.g., stability constraints, and/or item integrity or fragility, e.g., stress or fragility constraints, as further described in more detail herein.

In example embodiments, the item identification subsystems may include one or more imaging devices or sensors in communication with a controller or control system. For example, an imaging device may capture imaging data of one or more items to be packed. The controller may receive the imaging data and/or other data, and detect and identify the one or more items to be packed. In addition, the controller may determine or receive one or more item attributes associated with the one or more items to be packed, such as item size, shape, dimensions, volume, weight, stability, fragility, or other attributes.

In example embodiments, the pack planning subsystems may include the controller or control system that is configured to receive and process the imaging data and/or other data, and determine a pack plan for packing of the one or more items into one or more containers. For example, the controller may determine or receive a placement sequence of the one or more items based on respective item attributes. In addition, the controller may determine or receive a placement heuristic that may be used to generate placement poses for respective items. Then, the controller may determine or generate placement poses for respective items based on the placement sequence and placement heuristic. Further, the controller may determine, check, or verify whether the placement poses for respective items satisfy various constraints, including one or more containment constraints, stability constraints, and/or stress or fragility constraints. Upon a determination that the placement poses for respective items satisfy the various constraints, the controller may determine or generate a pack plan including the placement poses for respective items to be packed into one or more containers.

In example embodiments, the robotic packing subsystems may include one or more robotic arms or related equipment and one or more imaging devices or sensors, in communication with a controller or control system. For example, a robotic arm may pick and pack one or more items into one or more containers based on the generated pack plan. In addition, an imaging device may capture imaging data including pose data of the one or more packed items. The controller may instruct the robotic arm to pack the items into containers based on the pack plan. In addition, the controller may receive and process the imaging data and/or other data to determine whether the items have been packed according to the pack plan. Further, in response to determining that the items have not been packed according to the pack plan, the controller may determine or generate a new pack plan for remaining items including new placement poses for the remaining items, based at least in part on the pose data of packed items. Then, the controller may instruct the robotic arm to pack the remaining items into containers based on the new pack plan.

Using the autonomous robotic pack planning systems and methods described herein, a plurality of items may be autonomously packed into one or more containers while ensuring item stability and item integrity. The plurality of items may be automatically detected and identified, a pack plan that considers stability constraints and/or stress constraints may be automatically generated for packing of the plurality of items, and the plurality of items may be automatically packed into containers based on the pack plan. Further, the pack plan may be automatically and dynamically adjusted, modified, or regenerated based on real-time detection of packed items in containers.

FIG. 1 is a block diagram 100 of an example autonomous robotic pack planning system, in accordance with implementations of the present disclosure.

In example embodiments, the autonomous robotic pack planning system may comprise an item identification system or subsystem 110, a pack planning system or subsystem 120, and a robotic packing system or subsystem 130.

As described herein, the item identification subsystem 110 may detect and identify one or more items to be packed into one or more containers. Various imaging or scanning devices or sensors may capture imaging data in order to detect and identify the items. In addition, various models, e.g., bounding boxes, three-dimensional models, or other models, associated with detected and identified items may be received or determined to facilitate the autonomous robotic pack planning processes described herein. Further, various item attributes, e.g., size, shape, dimensions, volumes, weights, centers of gravity, moments of inertia, friction coefficients, stability attributes, stress or fragility attributes, stress or fragility thresholds, or other attributes, associated with detected and identified items may be received or determined to facilitate the autonomous robotic pack planning processes described herein.

In some example embodiments, the various models may be generated using various imaging or scanning techniques or algorithms, including single-view scanning using a single imaging or scanning device, multi-view scanning using multiple imaging or scanning devices, semantic shape completion, or other techniques or algorithms. In addition, the various models associated with items may include estimated poses of the items, which may be associated with three-dimensional bounding boxes or other indications of surfaces, edges, corners, or other portions of the items. Moreover, various changes, errors, or updates to portions of models or item attributes may be detected and learned over time based on imaging or scanning data and/or based on successful or unsuccessful generation and execution of pack plans, such as changes or updates to stability attributes, stress or fragility attributes, item size, shape, dimensions, volumes, or weights, and/or various other item attributes.

The pack planning subsystem 120 may generate or determine a pack plan for packing of the one or more items into one or more containers. For example, a placement sequence for the items may be determined based on item attributes associated with respective items. In addition, placement poses for respective items may be determined based at least in part on the placement sequence and a placement heuristic, rule, or algorithm. Various constraints may be considered or verified when generating or determining the placement poses of respective items in the pack plan, including containment constraints, stability constraints, and/or stress or fragility constraints.

In example embodiments, the placement sequence may be determined based on item sizes, shapes, dimensions, volumes, weights, and/or fragility. For example, some items may have an item attribute that indicates that the item is fragile, or an item attribute that indicates that the item is standard, i.e., not fragile. Items that are standard items may be sequenced first, and may be sequenced in order from largest size to smallest size, from largest volume to smallest volume, from heaviest weight to lightest weight, from rectangular prism or cuboid shapes to irregular, round, or curved shapes, and/or in other orders. Then, items that are fragile items may be sequenced second or last, and may be sequenced in order from largest size to smallest size, from largest volume to smallest volume, from heaviest weight to lightest weight, from rectangular prism or cuboid shapes to irregular, round, or curved shapes, and/or in other orders. Other example embodiments may generate or determine placement sequences based on various other item attributes, different priorities or weights associated with item attributes, or at random.

In some example embodiments, the placement heuristic, rule, or algorithm may comprise one or more rules or algorithms to plan placement poses of items in containers. For example, the placement heuristic may comprise a three-dimensional grid search algorithm, a deepest-bottom-left-most (DBLM) heuristic, a pack pile minimum volume increase rule, or other heuristics, rules, or algorithms to determine placement poses for respective items in containers. Generally, the placement heuristic may be selected or determined to facilitate collision-free placement of items, as well as efficient space utilization within containers.

In example embodiments, the containment constraints may comprise one or more constraints related to placement of items within one or more containers. Generally, the containment constraints may comprise size, shape, geometric, or dimensional constraints related to placement of an item within a container and relative to other items. For example, the containment constraints may include positioning of an item within an interior of the container, positioning of an item without interference, collisions, or overlap with one or more other items in the container, and/or positioning of the item to enable placement in the container by an agent. The agent may comprise a robotic arm, other robotic or automated equipment, or a human agent or associate.

The stability constraints may comprise one or more constraints related to stability, contact forces, and/or torques, e.g., due to the force of gravity, of items that have been placed within one or more containers and relative to other items. Generally, the stability constraints may comprise a contact force equilibrium and/or a torque equilibrium related to placement of an item within a container and relative to other items. For example, the stability constraints may include positioning of an item in static equilibrium, or quasi-static equilibrium, within a container and relative to other items. Quasi-static equilibrium may refer to placement poses in which an item is positioned against, in contact with, or leaning against substantially rigid portions of a container and/or other items adjacent or next to the item.

In some example embodiments, the stability constraints may be determined, checked, or verified based on analysis by a physics simulator, e.g., a high-speed physics simulator. For example, the physics simulator may simulate placement of an item at a placement pose within a container, and then simulate movement or settling of the item at a final position, e.g., a stable position within the container and relative to other items. Then, the final position that is determined or generated by the physics simulator may be output or provided as a placement pose for the item.

In other example embodiments, the stability constraints may be determined, checked, or verified based on analysis using linear programming optimization, quadratic programming optimization, or other related optimization methods. Generally, the linear or quadratic programming optimization methods may calculate or determine contact forces associated with an item at a placement pose, in which the contact forces may include normal components and tangential components. In addition, the stability constraints may check or verify whether the contact forces associated with the item are in static equilibrium with the force of gravity, and/or whether torques associated with the item due to the force of gravity are in static torque equilibrium. Furthermore, the stability constraints may check or verify whether the contact forces associated with the item are in quasi-static equilibrium with the force of gravity, and/or whether torques associated with the item due to the force of gravity are also in quasi-static torque equilibrium. Moreover, the stability constraints may check or verify that the item is supported and static, as well as not moving or sliding, when positioned at the placement pose. Further details of example stability constraints are described herein.

The stress or fragility constraints may comprise one or more constraints related to stress, forces, weight, damage, distortion, breakage, or fragility of items that have been placed within one or more containers and relative to other items. Generally, the stress constraints may comprise weights, contact forces, or stresses related to placement of an item within a container and on top of or in contact with one or more other items. For example, the stress constraints may include positioning of an item such that the item is not positioned on top of or upon another item having an item attribute of fragile.

In addition, the stress constraints may include positioning of an item such that a weight of the item is less than a maximum stress or fragility threshold associated with another item under or in contact with the item. Further, the stress constraints may include positioning of an item such that a sum of contact forces applied by the item is less than a maximum stress or fragility threshold associated with another item under or in contact with the item. Moreover, the stress constraints may include positioning of an item such that any individual contact force applied by the item is less than a maximum stress or fragility threshold associated with another item under or in contact with the item. Furthermore, the stress constraints may include positioning of an item such that any local stress applied by the item is less than a respective local stress or fragility threshold associated with another item under or in contact with the item.

In some example embodiments, the stress constraints may be determined, checked, or verified based on analysis using linear programming optimization, quadratic programming optimization, or other related optimization methods. Generally, the linear or quadratic programming optimization methods may calculate or determine weights, contact forces, or stresses associated with an item at a placement pose within a container and relative to other items. In addition, the stress constraints may check or verify whether the weights, contact forces, or stresses associated with the item do not exceed one or more thresholds, e.g., maximum weight thresholds, maximum stress thresholds, and/or local stress thresholds, associated with the item itself and/or other items within the container. Moreover, the stress constraints may prevent damage, distortion, breakage, or other losses with respect to one or more items within the container. Further details of example stress constraints are described herein.

The robotic packing subsystem 130 may execute a generated pack plan to pack a plurality of items into one or more containers. For example, a robotic arm may automatically pack items into a container based on the pack plan, e.g., according to a placement sequence and at determined placement poses within the container. In addition, various imaging or scanning devices or sensors may capture imaging data in order to detect the packed items. The imaging data may be processed to determine actual poses of the packed items, and the actual poses may be compared to the determined placement poses for the items during the packing process. As long as the actual poses are within one or more thresholds, e.g., threshold distances, displacements, and/or angles related to positions and/or orientations, of the determined placement poses for the items, the robotic arm may continue to pack items into the container.

If, however, an actual pose of an item exceeds, deviates, or differs from the determined placement pose for the item by more than the one or more thresholds, the robotic packing subsystem 130 may instruct the robotic arm to stop or pause packing items into the container. Then, the pack planning system 120 may dynamically generate a new pack plan for remaining items to be packed based at least in part on the actual poses of items within the container. As described herein, the pack planning system 120 may generate or determine a new pack plan including a new placement sequence for the remaining items, and new placement poses for respective remaining items based at least in part on the new placement sequence and a placement heuristic, rule, or algorithm, while again considering or verifying various constraints associated with the new placement poses of respective remaining items in the new pack plan, including containment constraints, stability constraints, and/or stress or fragility constraints.

Moreover, various changes, errors, or updates to portions of models or item attributes may be detected and learned over time based on imaging or scanning data and/or based on successful or unsuccessful generation and execution of pack plans, such as changes or updates to stability attributes, stress or fragility attributes, item size, shape, dimensions, volumes, or weights, and/or various other item attributes.

Although FIG. 1 illustrates an autonomous robotic pack planning system having various subsystems or components, other example embodiments of the autonomous robotic pack planning system may have different numbers, configurations, arrangements, or combinations of the various subsystems or components. For example, in some alternative example embodiments, portions of the subsystems may be shared or common among each of the subsystems. In further example embodiments, all of the subsystems and associated components may comprise a single, combined subsystem. In addition, in various example embodiments, controllers or control systems in communication with each of the subsystems may comprise a single, common controller or control system that is in communication with each of the subsystems.

Figure 2:
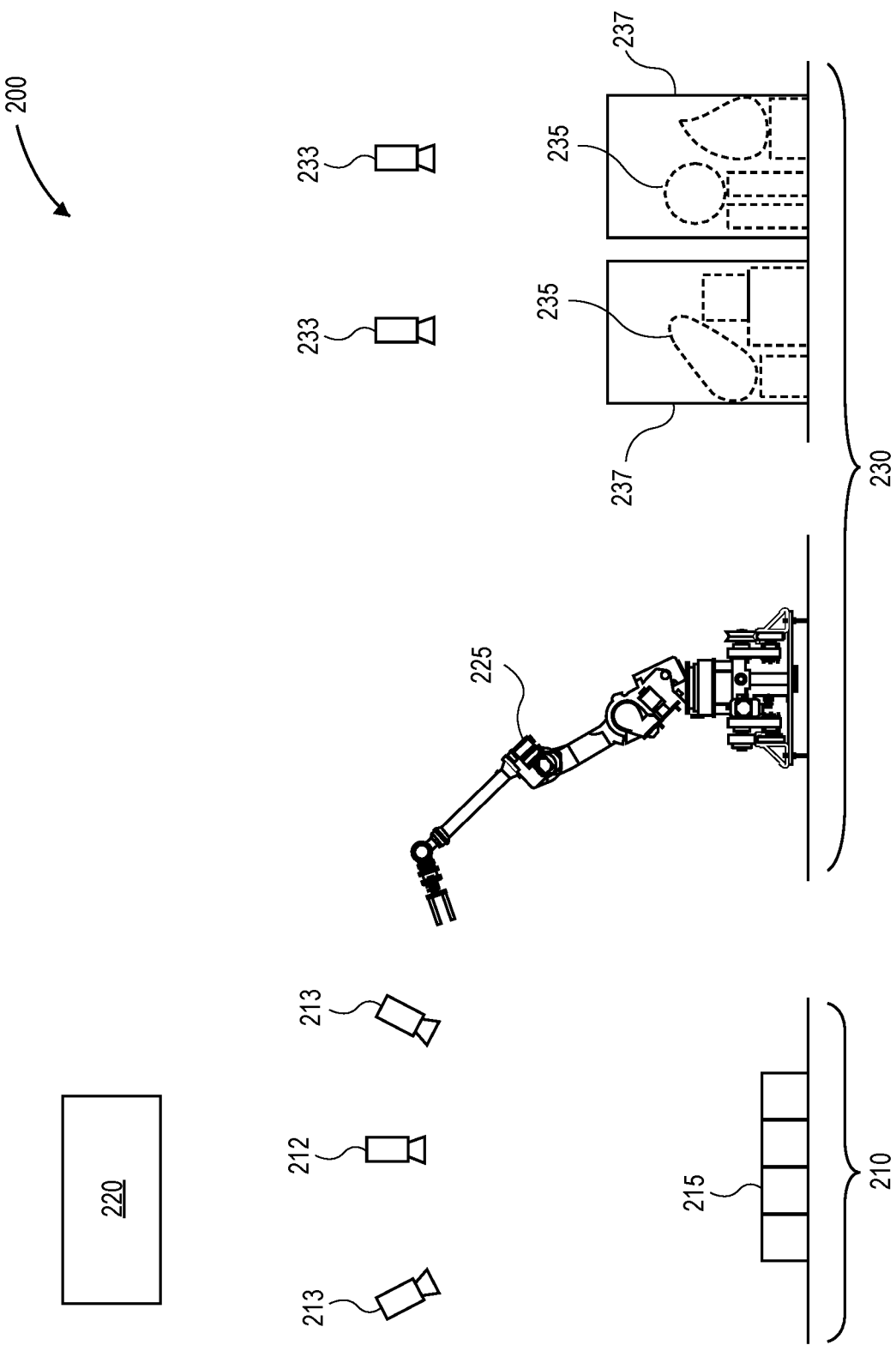
FIG. 2 is a schematic diagram of an example autonomous robotic pack planning system, in accordance with implementations of the present disclosure.

FIG. 2 is a schematic diagram 200 of an example autonomous robotic pack planning system, in accordance with implementations of the present disclosure.

The autonomous robotic pack planning system shown in FIG. 2 may comprise an item identification subsystem 210, a pack planning subsystem 220, and a robotic packing subsystem 230. The subsystems 210, 220, 230 and associated components illustrated and described with respect to FIG. 2 may substantially correspond to and may include any and all of the features of the subsystems 110, 120, 130 described with respect to FIG. 1.

The item identification subsystem 210 may comprise one or more imaging devices 212, 213 that are configured and oriented to capture imaging data of one or more items 215 to be picked. For example, the imaging devices may comprise a camera, imaging sensor, or imaging device 212 that is configured to capture red-green-blue (RGB) or color imaging data, and one or more stereo or 3D cameras, depth sensors, or depth imaging devices 213 that is configured to capture depth or ranging data. The imaging device 212 may capture RGB or color imaging data that may be processed to perform item segmentation of the items 215 to be picked. In addition, the imaging devices 213 may capture depth or ranging data that may be processed to determine item positions, orientations, and/or distances. Further, the RGB data and the depth data captured by imaging devices 212, 213 may be processed together to facilitate picking of items 215 by robotic arms or other agents.

The items 215 may comprise various types of items, including grocery items, such as proteins, vegetables, fruits, jars, cans, boxes, packages, bags, bottles, jugs, or various other types of items that may be picked and packed into one or more containers. Further, the items 215 may be transported to and from the item identification subsystem 210 via one or more pallets, lift trucks, conveyors, robotic drive units, automatically guided vehicles, manually operated carts or vehicles, or various other conveyance mechanisms or equipment.

Moreover, the item identification subsystem 210 may be in communication with a controller or control system, such as a controller associated with the pack planning subsystem 220. The pack planning subsystem 220 may comprise one or more processors, memories or datastores, processing modules or algorithms, or other components. In addition, the robotic packing subsystem 230 may also be in communication with a controller or control system, such as a controller associated with the pack planning subsystem 220. Further details of various components of an example controller are described herein at least with respect to FIG. 7.

As described herein, the pack planning subsystem 220 may receive imaging data from the one or more imaging devices 212, 213 of the item identification subsystem 210, and may process the imaging data to detect and identify items 215 to be picked. The pack planning subsystem 220 may determine or receive item attributes and/or item models associated with the identified items 215. Based on the item attributes and/or item models, the pack planning subsystem 220 may generate or determine a placement sequence for the items 215. Further, the pack planning subsystem 220 may determine or receive a placement heuristic, rule, or algorithm to generate placement poses for the items 215.

Then, based on the placement sequence and the placement heuristic, the pack planning subsystem 220 may generate or determine placement poses for each of the items 215. For each placement pose of an item, the pack planning subsystem 220 may determine, check, or verify that one or more constraints are satisfied, including containment constraints, stability constraints, and/or stress constraints. Upon determining that the one or more constraints are satisfied for a placement pose of an item, the pack plan may be updated to include the placement pose for the item. The pack planning subsystem 220 may continue generating or determining placement poses for all items 215 to be packed together in one or more containers, e.g., associated with a group of items or an order of items by a customer, to thereby generate a complete pack plan for the items 215.

The robotic packing subsystem 230 may comprise a robotic arm, movement device, or other automated robotic device 225, one or more imaging devices 233, and one or more containers 237 to receive packed items 235. For example, the robotic arm 225 may comprise a six-axis robotic arm or other type of robotic arm, and associated end effector, that is configured to pick and pack items 235 into one or more containers 237 based on a pack plan.

The imaging devices 233 may comprise one or more of a camera, imaging sensor or device, stereo or 3D camera, depth sensor, or depth imaging device that is configured to capture red-green-blue (RGB) or color imaging data and/or depth or ranging data of the one or more packed items 235. In some example embodiments, the imaging devices 233 may capture at least depth or ranging data that may be processed to detect and determine actual pose data of packed items 235 within containers 237.

The containers 237 may comprise bags, pouches, totes, boxes, crates, or other types of containers that are configured to receive one or more packed items 235. In some example embodiments, the walls and surfaces of the containers 237 may be flexible or resilient, such that the containers 237 and walls and surfaces thereof may deform, bend, or flex upon application of weights, forces, or stresses. In other example embodiments, the walls and surfaces of the containers 237 may be at least partially rigid or inflexible, such that the containers 237 and walls and surfaces thereof may maintain their shape and/or positions upon application of weights, forces, or stresses up to one or more thresholds.

The packed items 235 may comprise various types of items, including grocery items, such as proteins, vegetables, fruits, jars, cans, boxes, packages, bags, bottles, jugs, or various other types of items that may be picked and packed into one or more containers 237. Further, the packed items 235 may be transported to and from the robotic packing subsystem 230 via one or more pallets, lift trucks, conveyors, robotic drive units, automatically guided vehicles, manually operated carts or vehicles, or various other conveyance mechanisms or equipment.

As described herein, the pack planning subsystem 220 may also receive imaging data from the one or more imaging devices 233 of the robotic packing subsystem 230, and may process the imaging data to detect and identify actual poses of packed items 235 within containers 237. The pack planning subsystem 220 may determine whether the actual poses of packed items 235 align, correspond, or match with the placement poses for the items according to the pack plan, e.g., within one or more thresholds such as threshold distances, displacements, and/or angles related to positions and/or orientations of the packed items 235. If the actual poses of the packed items 235 align within one or more thresholds with the placement poses for the items, the pack planning subsystem 220 may instruct the robotic packing subsystem 230 to continue packing items 235 into containers 237. Alternatively, the robotic packing subsystem 230 may continue packing items 235 into containers 237 unless or until the pack planning subsystem 220 instructs the robotic packing subsystem 230 to stop or pause.

If, however, the actual poses of the packed items 235 do not align within one or more thresholds with the placement poses for the items, the pack planning subsystem 220 may instruct the robotic packing subsystem 230 to stop or pause packing items 235 into containers 237, in order to avoid potential damage, distortion, breakage, or other losses with respect to one or more packed items 235 within the containers 237. Then, as further described herein, the pack planning subsystem 220 may dynamically generate or determine a new pack plan having an associated new placement sequence and new placement poses for respective remaining items to be packed, while again ensuring that the various constraints are satisfied, including containment constraints, stability constraints, and/or stress constraints.

Although FIG. 2 illustrates an autonomous robotic pack planning system having various subsystems or components, other example embodiments of the autonomous robotic pack planning system may have different numbers, configurations, arrangements, or combinations of the various subsystems or components. For example, in some alternative example embodiments, portions of the subsystems may be shared or common among each of the subsystems. In further example embodiments, all of the subsystems and associated components may comprise a single, combined subsystem. In addition, in various example embodiments, controllers or control systems in communication with each of the subsystems may comprise a single, common controller or control system that is in communication with each of the subsystems.

Moreover, the relative positions and orientations of components of each of the subsystems may be modified or changed while still performing the same or similar functions and operations. In one example modification, one or more imaging devices may be coupled to or movable with the robotic arm or other automated, robotic movement device. In another example modification, a controller associated with the pack planning subsystem 220 may be at least partially integrated with a controller associated with the robotic arm or other automated, robotic movement device. Various other modification or changes to numbers, configurations, or arrangements of the various components described herein are also possible, while maintaining the same or similar functions and operations.

Figure 3:
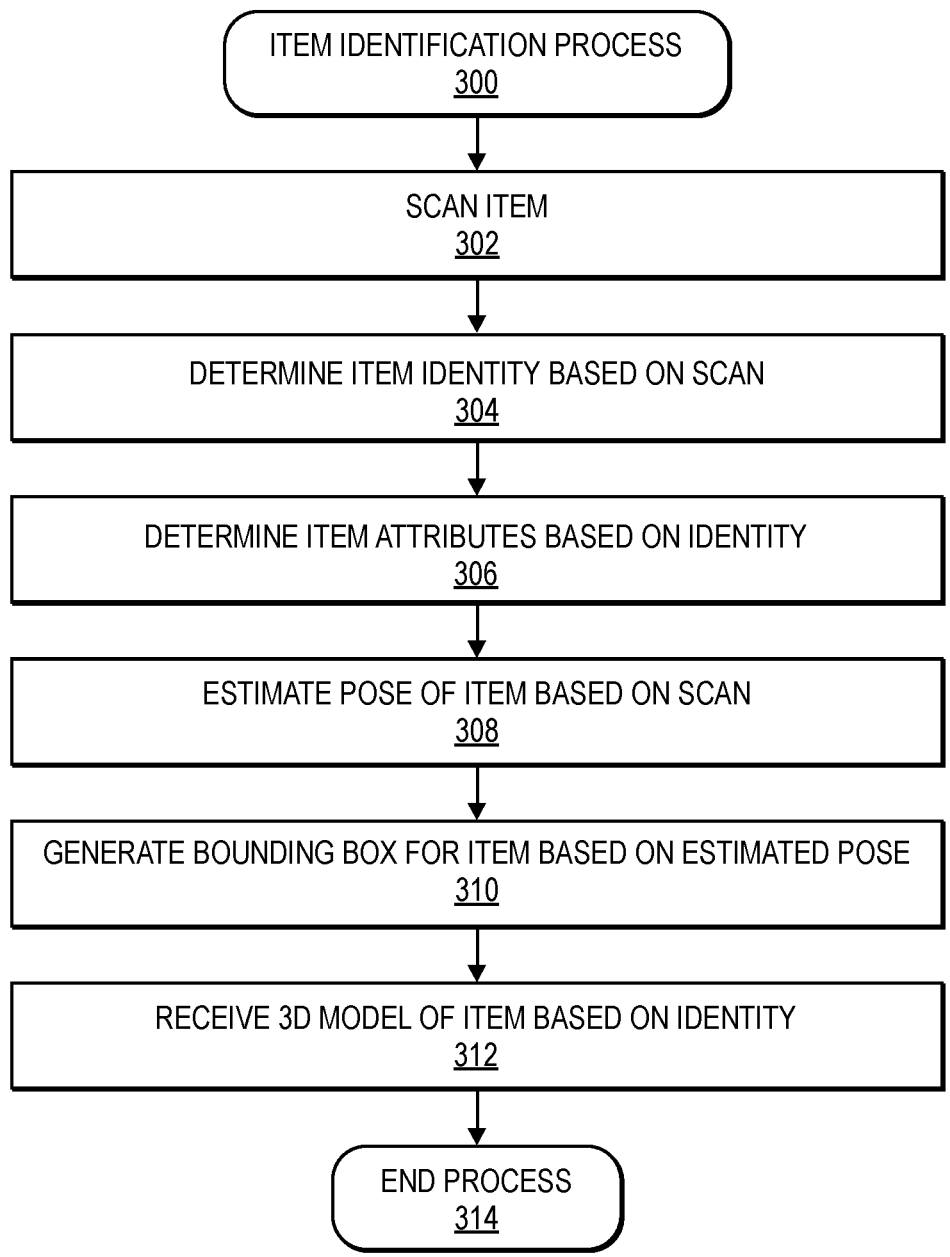
FIG. 3 is a flow diagram illustrating an example item identification process, in accordance with implementations of the present disclosure.

FIG. 3 is a flow diagram illustrating an example item identification process 300, in accordance with implementations of the present disclosure. Various steps of the process 300 described herein may be optional, and/or may be performed in series or in parallel with each other.

The process 300 may begin by scanning an item, as at 302. For example, one or more imaging devices may be configured and oriented to capture imaging data of one or more items to be picked. The imaging devices may comprise one or more cameras, imaging sensors or devices, stereo or 3D cameras, and/or depth sensors or imaging devices that are configured to capture red-green-blue (RGB) or color imaging data and/or depth or ranging data. In addition, the imaging devices may perform top-down scanning of the items using single or multiple scanning devices, and/or scanning of the items from various other positions, orientations, or perspectives. Further, a controller may instruct scanning of an item.

The process 300 may continue by determining an item identity based on the scan, as at 304. For example, the captured RGB or color imaging data and/or depth data may be processed to detect and identify one or more items. The items may be identified in various manners, such as by detecting and scanning a barcode, QR code, or other identifier associated with the items, detecting and identifying labels, words, symbols, characters, or other indicia associated with the items, and/or by detecting and identifying size, shape, dimensions, volume, weight, or other attributes associated with the items. Various image processing techniques or algorithms may be used to detect and identify items based on the captured imaging data. Further, a controller may determine an item identity based on the scan.

The process 300 may then proceed by determining item attributes based on the identity, as at 306. For example, upon identifying items based on captured imaging data, one or more item attributes associated with the items may be determined or received from a datastore or other repository that stores item attributes in association with items and/or item identifiers. The various item attributes may include size, shape, dimensions, volumes, weights, centers of gravity, moments of inertia, friction coefficients, stability attributes, stress or fragility attributes, stress or fragility thresholds, or other attributes associated with the detected and identified items. Further, a controller may determine item attributes based on identified items.

The process 300 may continue to estimate a pose of an item based on the scan, as at 308. For example, the captured RGB or color imaging data and/or depth data may be processed to detect and estimate poses of identified items. The estimated poses may include estimated position and/or orientation data for individual items, which may be generated based on depth data captured by one or more imaging devices. Various image processing techniques or algorithms, such as semantic shape completion or other related algorithms or techniques, may be used to detect and estimate poses of items based on the captured imaging data. Further, a controller may instruct pose estimation of an item based on the scan.

The process 300 may then proceed to generate a bounding box for the item based on the estimated pose, as at 310. For example, based on the estimated poses of items, one or more bounding boxes may be determined or generated for the items. The bounding boxes may indicate outer surfaces, curves, edges, corners, peripheries, or other portions of the items. In addition, the bounding boxes may include surface or texture data associated with one or more surfaces or other portions of the items. Various image processing techniques or algorithms, such as semantic shape completion or other related algorithms or techniques, may be used to determine or generate bounding boxes associated with items based on the captured imaging data. Further, a controller may instruct generation of a bounding box for an item based on the estimated pose.

The process 300 may continue with receiving a three-dimensional model of an item based on the item identity, as at 312. For example, upon identifying items based on captured imaging data, one or more three-dimensional models of the detected and identified items may be determined or received from a datastore or other repository that stores three-dimensional models of items in association with items and/or item identifiers. Alternatively or in addition, one or more three-dimensional models of the detected and identified items may be created or generated based on the estimated poses and/or bounding boxes associated with the items. Various image processing techniques or algorithms, such as semantic shape completion or other related algorithms or techniques, may be used to determine or generate three-dimensional models associated with items based on item identities, item attributes, estimated poses, and/or bounding boxes. Further, a controller may receive or generate a three-dimensional model of an item based at least on the item identity.

The process 300 may then end, as at 314.

Figure 4:
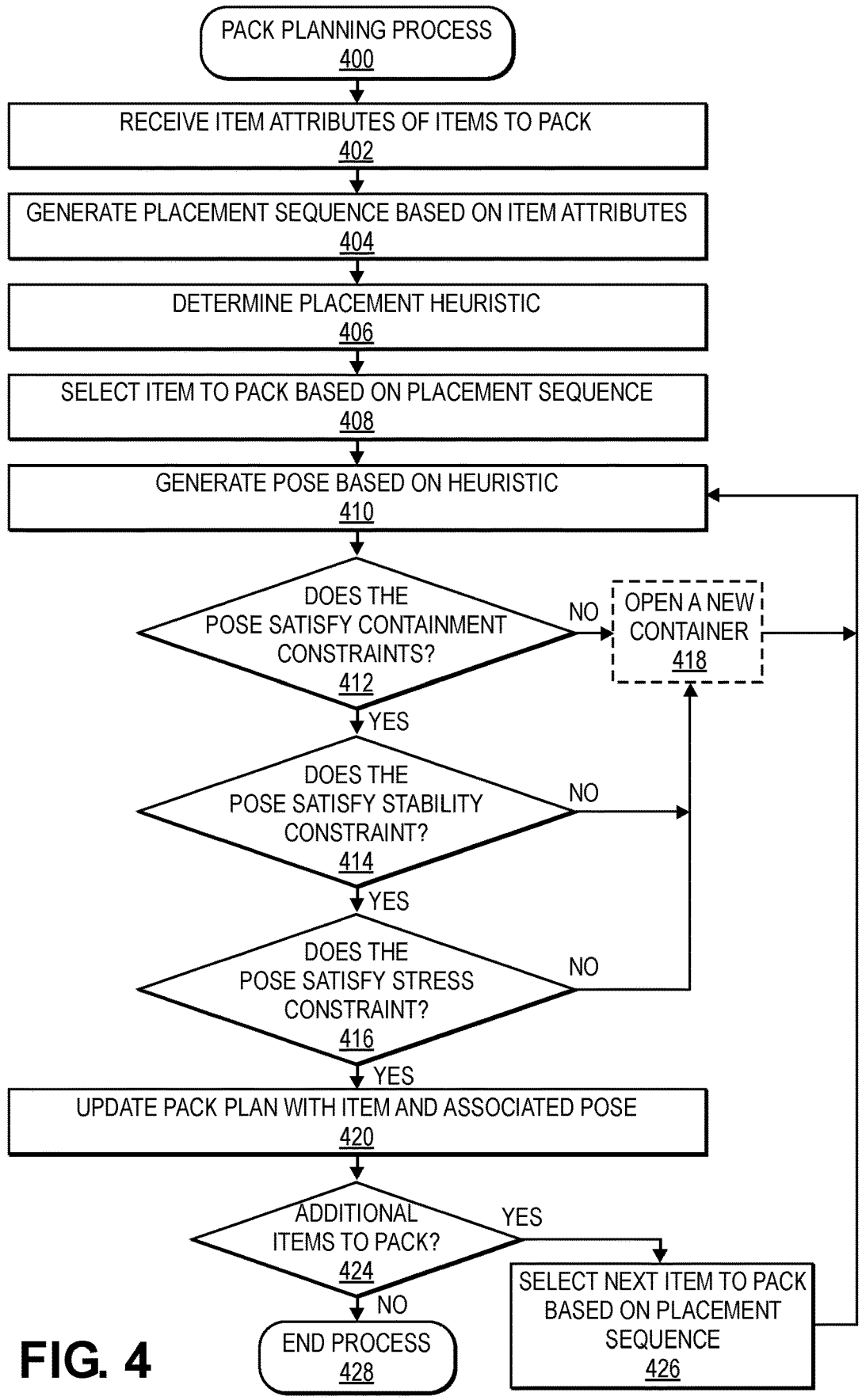
FIG. 4 is a flow diagram illustrating an example pack planning process, in accordance with implementations of the present disclosure.

FIG. 4 is a flow diagram illustrating an example pack planning process 400, in accordance with implementations of the present disclosure.

The process 400 may begin by receiving item attributes of one or more items to pack, as at 402. For example, the item attributes may include item identity, size, shape, dimensions, volumes, weights, centers of gravity, moments of inertia, friction coefficients, stability attributes, stress or fragility attributes, stress or fragility thresholds, or other attributes associated with a plurality of items to be packed. The item attributes may also include estimated poses, bounding boxes, and/or three-dimensional models associated with the items. Further, a controller may receive the item attributes of a plurality of items to be packed.

The process 400 may continue by generating a placement sequence based on the item attributes, as at 404. For example, the placement sequence for a plurality of items to be packed may be determined based on item sizes, shapes, dimensions, volumes, weights, fragility, and/or other item attributes. As described herein, items that are standard items, i.e., items that are not fragile and upon which other items may be placed, may be sequenced first, such as in order from largest size to smallest size, from largest volume to smallest volume, from heaviest weight to lightest weight, from rectangular prism or cuboid shapes to irregular, round, or curved shapes, and/or in other orders. Then, items that are fragile items, i.e., items on top of which other items should not be placed, may be sequenced second or last, such as in order from largest size to smallest size, from largest volume to smallest volume, from heaviest weight to lightest weight, from rectangular prism or cuboid shapes to irregular, round, or curved shapes, and/or in other orders. In other example embodiments, placement sequences may be generated or determined in various other manners, such as sequencing items with lower fragility before items with higher fragility, sequencing items with higher maximum force or stress thresholds before items with lower maximum force or stress thresholds, and/or other sequences based on varying fragility attributes of items. Further, a controller may generate a placement sequence for a plurality of items to be packed based on one or more item attributes.

The process 400 may proceed by determining a placement heuristic, as at 406. For example, the placement heuristic, rule, or algorithm may comprise one or more rules or algorithms to plan placement poses of items in containers. As described herein, the placement heuristic may comprise a three-dimensional grid search algorithm, a deepest-bottom-left-most (DBLM) heuristic, a pack pile minimum volume increase rule, or other heuristics, rules, or algorithms to determine placement poses for respective items in containers. Further, a controller may determine or receive the placement heuristic by which to determine placement poses for items based on the placement sequence.

The process 400 may continue to select an item to pack based on the placement sequence, as at 408. For example, an item of a plurality of items to be packed may be initially selected for placement according to the placement sequence, in order to determine or generate a stable and safe placement pose for the item within a container, as further described herein. Further, a controller may select an item to pack based on the placement sequence.

The process 400 may proceed to generate a pose based on the heuristic, as at 410. For example, for each selected item of the plurality of items to be packed, a placement pose for the item within a container may be determined or generated according to the placement heuristic, rule, or algorithm. In some example embodiments, candidate placement poses for the item may be processed, analyzed, or settled by a physics simulator, e.g., a high-speed physics simulator. As described herein, the physics simulator may simulate placement of an item at one or more candidate placement poses within a container, and may also simulate movement or settling of the item at respective final positions, e.g., stable positions within the container and relative to other items, for each of the candidate placement poses. Then, a final candidate placement pose that is determined or generated by the physics simulator may be selected for output as the placement pose for the item. Further, a controller may generate a placement pose based on the placement heuristic.

In one example embodiment, a set of lowest, collision-free, candidate placement poses, or transforms, may be generated from a three-dimensional grid search. Then, each candidate placement pose may be ranked based on a DBLM heuristic. Each of the candidate placement poses may then be processed, analyzed, or settled using a physics engine or simulator to select or generate a final candidate placement pose, subject to one or more of the various constraints described herein.

Furthermore, in the three-dimensional grid search for the set of lowest, collision-free, candidate placement poses, rather than searching in six-dimensional space for candidate placement poses, the rolls and pitches of an item may be restricted to a set of planar-stable orientations, which may comprise a set of stable resting orientations of the item on a planar surface. This modified three-dimensional grid search for candidate placement poses may speed up the determination or generation of placement poses for items. In this manner, a geometry of a container, and a geometry and a set of planar-stable rolls and pitches of the item may be processed or analyzed to generate candidate placement poses. In addition, two-dimensional heightmaps may be used to accelerate the computation of lowest, collision-free, candidate placement poses. The physics engine or simulator may process, analyze, or settle each of the candidate placement poses in sequence, e.g., based on scores or rankings of the candidate placement poses, until a stable and safe candidate placement pose is identified, subject to one or more of the various constraints described herein. Upon identifying a candidate placement pose that satisfies or meets the various constraints, the candidate placement pose may be output or provided as the placement pose for the item.

Moreover, as placement poses for individual items of the plurality of items to be packed within one or more containers are determined, a pack plan may be generated or updated including the determined placement poses. For example, the pack plan may include data associated with a container, a geometry of the container, a set of items to be packed in the container, a placement sequence for the set of items, geometries associated with the set of items, placement poses of the set of items, and/or other data or information. In some example embodiments, a pack plan may include data associated with packing respective sets of items into individual containers of a set of containers.

The process 400 may continue with determining whether a candidate placement pose satisfies the containment constraints, as at 412. For example, the containment constraints may comprise one or more constraints related to placement of items within one or more containers. Generally, the containment constraints may comprise size, shape, geometric, or dimensional constraints related to placement of an item within a container and relative to other items. In example embodiments, the containment constraints may include positioning of an item within an interior of the container, positioning of an item without interference, collisions, or overlap with one or more other items in the container, and/or positioning of the item to enable placement in the container by an agent, such as a robotic arm, other robotic or automated equipment, or a human agent or associate. Further, a controller may determine whether a candidate placement pose satisfies the containment constraints.

The process 400 may proceed with determining whether a candidate placement pose satisfies the stability constraints, as at 414. For example, the stability constraints may comprise one or more constraints related to stability, contact forces, and/or torques, e.g., due to the force of gravity, of items that have been placed within one or more containers and relative to other items. Generally, the stability constraints may comprise a contact force equilibrium and/or a torque equilibrium related to placement of an item within a container and relative to other items. In example embodiments, the stability constraints may include positioning of an item in static equilibrium, or quasi-static equilibrium, within a container and relative to other items. Quasi-static equilibrium may refer to placement poses in which an item is positioned against, in contact with, or leaning against substantially rigid portions of a container and/or other items adjacent or next to the item. Further, a controller may determine whether a candidate placement pose satisfies the stability constraints.

In some example embodiments, the stability constraints may be determined, checked, or verified based on analysis by a physics simulator, e.g., a high-speed physics simulator. For example, the physics simulator may simulate placement of an item at a placement pose within a container, and then simulate movement or settling of the item at a final position, e.g., a stable position within the container and relative to other items. Then, the final position that is determined or generated by the physics simulator may be output or provided as a placement pose for the item.

In other example embodiments, the stability constraints may be determined, checked, or verified based on analysis using linear programming optimization, quadratic programming optimization, or other related optimization methods. Generally, the linear or quadratic programming optimization methods may calculate or determine contact forces associated with an item at a placement pose, in which the contact forces may include normal components and tangential components. In addition, the stability constraints may check or verify whether the contact forces associated with the item are in static equilibrium with the force of gravity, and/or whether torques associated with the item due to the force of gravity are in static torque equilibrium. Furthermore, the stability constraints may check or verify whether the contact forces associated with the item are in quasi-static equilibrium with the force of gravity, and/or whether torques associated with the item due to the force of gravity are also in quasi-static torque equilibrium. Moreover, the stability constraints may check or verify that the item is supported and static, as well as not moving or sliding, when positioned at the placement pose.

In an example embodiment, the linear or quadratic programming optimization methods may determine whether an item positioned at a placement pose is in static equilibrium under gravity and frictional contact forces with portions of the container and/or other items in the container. For example, for a set of contact points ($C_1, C_2 \ldots C_N$) associated with an item at a placement pose, a contact force exerted or applied at a contact point $C_i$ may be denoted as $F_i^c$, a unit normal at a contact point $C_i$ may be denoted as $n_i$, the static friction coefficient may be denoted as $\mu$, and the moment arm at a contact point $C_i$ may be denoted as $r_i$.

A normal force $F_i^n$ at a contact point $C_i$ may correspond to the normal component of the contact force and may be calculated as follows:

$$F_i^n = (n_i \cdot F_i^c) n_i \quad (1)$$

In addition, a friction force $F_i^t$ at a contact point $C_i$ may correspond to the tangential component of the contact force and may be calculated as follows:

$$F_i^t = F_i^c - (n_i \cdot F_i^c) n_i \quad (2)$$

Then, it may be determined whether an item is in static equilibrium by determining whether the sum of the contact forces for the set of contact points of an item is in balance with the force of gravity upon the item, e.g., contact force equilibrium, and by determining whether the sum of torques for the set of contact points of an item is balanced or equal to zero, e.g., torque equilibrium.

For example, the determination of whether the sum of the contact forces is in balance with the force of gravity may be calculated as follows:

$$\Sigma_{i=1}^{N} F_i^c + G = 0 \quad (3)$$

in which G denotes the force of gravity upon the item, with the sum of the contact forces having a direction that is opposite that of the force of gravity.

In addition, the determination of whether the sum of torques is balanced may be calculated as follows:

$$\Sigma_{i=1}^{N} r_i \times F_i^c = 0 \quad (4)$$

Moreover, it may be determined whether an item is in static equilibrium by also determining whether the following two conditions related to normal forces, and tangential and frictional forces are satisfied.

For example, the first condition may relate to whether the contact forces along respective unit normals point toward the item, such that the item is static and supported, and may be calculated as follows:

$$(F_i^c \cdot n_i) > 0 \quad (5)$$

In addition, the second condition may determine whether the Euclidean norm of tangential forces is less than or equal to the Euclidean norm of frictional forces, such that the item is not moving or sliding, and may be calculated as follows:

$$\|F_i^t\|_2 \leq \mu \|F_i^n\|_2 \quad (6)$$

Upon determining that the contact force equilibrium and torque equilibrium equations (3) and (4) are satisfied, and subject to determinations that the above two conditions related to normal forces (5), and tangential and frictional forces (6) are also satisfied, it may be determined that the item positioned at the placement pose is in static force and torque equilibrium. As a result, it may be determined that the placement pose for the item satisfies the stability constraints.

The process 400 may continue by determining whether a candidate placement pose satisfies the stress constraints, as at 416. For example, stress or fragility constraints may comprise one or more constraints related to stress, forces, weight, damage, distortion, breakage, or fragility of items that have been placed within one or more containers and relative to other items. Generally, the stress constraints may comprise weights, contact forces, or stresses related to placement of an item within a container and on top of or in contact with one or more other items. Further, a controller may determine whether a candidate placement pose satisfies the stress constraints.

In some examples, the stress constraints may include positioning of an item such that the item is not positioned on top of or upon another item having an item attribute of fragile. In addition, the stress constraints may include positioning of an item such that a weight of the item is less than a maximum stress or fragility threshold associated with another item under or in contact with the item. Further, the stress constraints may include positioning of an item such that a sum of contact forces applied by the item is less than a maximum stress or fragility threshold associated with another item under or in contact with the item. Moreover, the stress constraints may include positioning of an item such that any individual contact force applied by the item is less than a maximum stress or fragility threshold associated with another item under or in contact with the item. Furthermore, the stress constraints may include positioning of an item such that any local stress applied by the item is less than a respective local stress or fragility threshold associated with another item under or in contact with the item.

In some example embodiments, the stress constraints may be determined, checked, or verified based on analysis using linear programming optimization, quadratic programming optimization, or other related optimization methods. Generally, the linear or quadratic programming optimization methods may calculate or determine weights, contact forces, or stresses associated with an item at a placement pose within a container and relative to other items. In addition, the stress constraints may check or verify whether the weights, contact forces, or stresses associated with the item do not exceed one or more thresholds, e.g., maximum weight thresholds, maximum stress thresholds, and/or local stress thresholds, associated with the item itself and/or other items within the container. Moreover, the stress constraints may prevent damage, distortion, breakage, or other losses with respect to one or more items within the container.

If it is determined that any of the containment constraints, stability constraints, or stress constraints is not satisfied by a placement pose for an item, the process 400 may return to step 410 to select or generate another candidate placement pose for the item based on the placement heuristic. Then, the process may proceed to determine whether the selected candidate placement pose satisfies the various constraints, as described herein. Further, a controller may determine whether any of the various constraints is not satisfied, and may select or generate another candidate placement pose for analysis or verification.

Optionally, if it is determined that any of the containment constraints, stability constraints, or stress constraints is not satisfied by one or more placement poses for an item, the process 400 may also open a new container, as at 418. For example, if an item cannot be positioned in a container without collisions or interferences with other items within the container, and/or if an agent cannot manipulate an item to any available space within the container, a new container may be opened, and a placement pose for the item may be selected to place the item in the new container. In addition, if no candidate placement poses for an item within a container satisfy the stability constraints and/or stress constraints associated with the item and/or other items in the container, a new container may be opened, and a placement pose for the item may be selected to place the item in the new container. Further, a controller may determine to open a new container to continue generation of placement poses for items to be packed.

In additional example embodiments, if it is determined that any of the containment constraints, stability constraints, or stress constraints is not satisfied by one or more placement poses for an item, the process may alternatively return to step 408 to select a different or next item to pack based on the placement sequence, while skipping or setting aside the previous item. Then, a candidate placement pose may be generated or selected for the different or next item, and the candidate placement pose may be processed or analyzed with respect to the various constraints, as described herein.

In further example embodiments, if it is determined that any of the containment constraints, stability constraints, or stress constraints is not satisfied by one or more placement poses for an item, the process may alternatively return to step 406 to select or receive a new placement heuristic for all or remaining items of a plurality of items to be packed into one or more containers. Then, the new placement heuristic may be utilized to select individual items and generate placement poses for all or remaining items to be packed into one or more containers.

In still further example embodiments, if it is determined that any of the containment constraints, stability constraints, or stress constraints is not satisfied by one or more placement poses for an item, the process may alternatively return to step 404 to generate a new placement sequence for all or remaining items of a plurality of items to be packed into one or more containers. Then, the new placement sequence may be utilized to select individual items and generate placement poses for all or remaining items to be packed into one or more containers.

If, however, it is determined that all of the containment constraints, stability constraints, and stress constraints are satisfied by a placement pose for an item, the process 400 may continue to update the pack plan with the item and the associated placement pose, as at 420. For example, a pack plan may be generated or updated including the determined placement pose for the item. As described herein, the pack plan may include data associated with one or more containers, geometries of the containers, one or more items to be packed in the containers, a placement sequence for the items, geometries associated with the items, placement poses of the items, and/or other data or information. Further, a controller may update the pack plan with the item and determined placement pose.

Moreover, a heightmap associated with the container may also be generated and updated as placement poses for items to be packed within the container are output or generated. The heightmap may be generated and updated to facilitate stacking of one or more items on top of placement poses of items that have already been planned for packing into a container. In addition, for example embodiments in which some items may have item attributes designated as fragile, i.e., no other items should be placed on top of such items, portions of the heightmap that are above or on top of such fragile items may be updated to a maximum height of the container, such that no candidate placement poses for additional items to be packed may be positioned on top of the fragile items.

The process 400 may then proceed by determining whether any additional items are to be packed, as at 424. For example, a plurality of items to be packed may comprise a group of items, an order of items by a customer, or any other grouping or aggregation of items to be packed together in one or more containers. Further, a controller may determine whether any additional items are to be packed.

If there are additional items to pack within the one or more containers, the process 400 may continue to select a next item to pack based on the placement sequence, as at 426. For example, a next item of the plurality of items to be packed may be selected for placement according to the placement sequence, and the process may return to step 410 to determine or generate a stable and safe placement pose for the item within a container, as further described herein. Further, a controller may select the next item to pack based on the placement sequence.

If, however, there are no additional items to pack within the one or more containers, the process 400 may then end, as at 428. For example, a generated pack plan for a plurality of items associated with a group, order, or other aggregation or items may be determined to be stable, safe, and complete, such that all placement poses of the items to be packed within one or more containers meet or satisfy the various constraints described herein, including the containment constraints, the stability constraints, and the stress constraints.

By generating a pack plan that takes into account containment constraints, stability constraints, and/or stress constraints, stable, safe, and secure packing of a plurality of items may be performed substantially autonomously or automatically, e.g., using a robotic or automated packing subsystem. Because the pack planning process verifies that packed items are positioned in stable positions relative to a container and/or other items, and because the pack planning process verifies that packed items do not damage, distort, or break other items within a container, the pack planning process as described herein may generate more reliable and efficient pack plans that facilitate or enable robotic or automated packing processes while also reducing potential damage, breakage, or losses.

Figure 5:
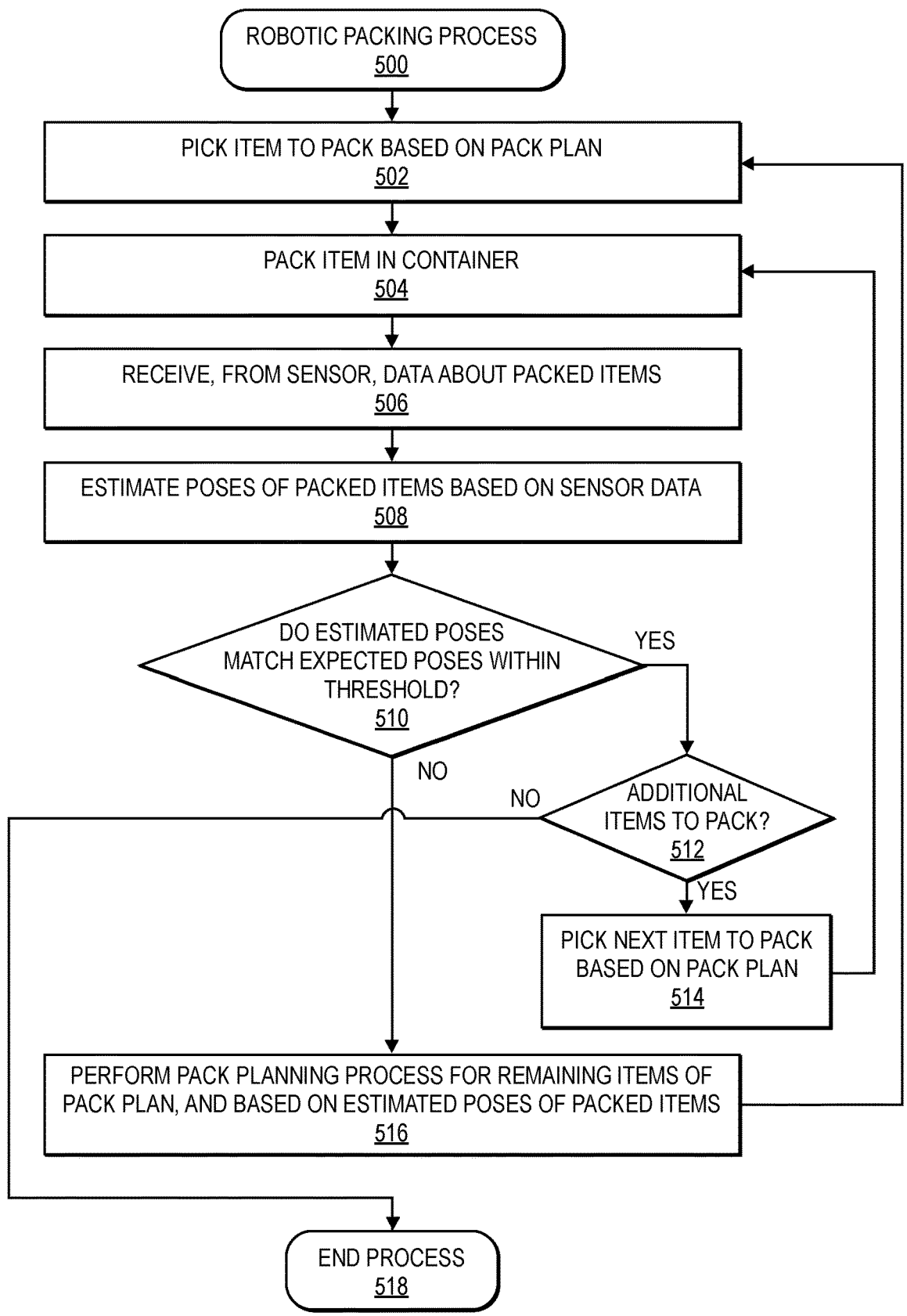
FIG. 5 is a flow diagram illustrating an example robotic packing process, in accordance with implementations of the present disclosure.

FIG. 5 is a flow diagram illustrating an example robotic packing process 500, in accordance with implementations of the present disclosure.

The process 500 may begin by picking an item to pack based on a pack plan, as at 502. For example, a robotic arm and associated end effector, other automated robotic device, or other agent may pick an item to pack according to the generated pack plan. As described herein, one or more imaging sensors or devices may assist in autonomous or automatic picking of the items by a robotic arm and end effector. Further, a controller may instruct a robotic arm and end effector to pick the item to pack based on the pack plan.

The process 500 may continue by packing the item in a container, as at 504. For example, the robotic arm and associated end effector may move, transport, rotate, or otherwise manipulate the item, and place the item at the determined placement pose within the container based on the pack plan. As described herein, one or more imaging sensors or devices may also assist in autonomous or automatic placement and packing of the items by a robotic arm and end effector. Further, a controller may instruct a robotic arm and end effector to transport and pack the item in a container based on the pack plan.

The process 500 may then proceed by receiving, from a sensor, data about the packed items, as at 506. For example, one or more imaging sensors or devices, including depth or ranging sensors, may capture RGB data and/or depth or ranging data associated with the packed items within a container. The imaging or scanning sensors or devices may capture RGB and/or depth data associated with packed items in the container as individual items are packed in the container. Further, a controller may receive the sensor data associated with the packed items in a container.

The process 500 may then continue to estimate poses of packed items based on the sensor data, as at 508. For example, the captured RGB or color imaging data and/or depth data may be processed to detect and estimate poses of packed items. The estimated poses may include estimated position and/or orientation data for individual items, which may be generated based on depth data captured by one or more imaging devices. As a result, the estimated poses may comprise actual pose data, including actual positions and/or orientations, of packed items based on the RGB and/or depth data that is captured as individual items are packed in the container. Furthermore, an actual depthmap associated with the packed items may be generated based on the depth data. Various image processing techniques or algorithms, such as semantic shape completion or other related algorithms or techniques, may be used to detect and estimate poses of items based on the captured imaging data. Further, a controller may instruct pose estimation of packed items based on the sensor data.

The process 500 may proceed to determine whether the estimated poses match the expected poses of the packed items within one or more thresholds, as at 510. For example, after processing the imaging or sensor data to determine actual poses of the packed items in the container, the actual poses may be compared to the determined placement poses for the items during the packing process to determine whether they match or correspond to the determined placement poses within one or more thresholds, e.g., threshold distances, displacements, and/or angles related to positions and/or orientations. In example embodiments, the actual poses of packed items may vary or differ from the determined placement poses for the items due to various factors, e.g., item attribute errors, item model errors, physics simulation or modeling errors, linear or quadratic programming or modeling errors, robotic arm and/or end effector positioning errors, shifting or movement of packed items, external forces or stresses applied to the items and/or containers, and/or various other factors. Further, a controller may determine whether estimated or actual poses of packed items match expected or determined placement poses for the items within one or more thresholds.

In example embodiments, if any distances, displacements, and/or angles related to differences between actual poses and determined placement poses are within one or more thresholds, the packed items may be determined to have been packed substantially according to the pack plan. In addition, small changes to distances, displacements, and/or angles that remain within the one or more thresholds may be accounted for by corresponding small changes to respective placement poses of any remaining items that are to be packed in the container.

In other example embodiments, if any distances, displacements, and/or angles related to differences between actual poses and determined placement poses are not within one or more thresholds, the packed items may be determined to have shifted or moved significantly away from or outside of the determined placement poses of the pack plan. In some examples, such shifts or movements of the actual poses away from or outside of the determined placement poses by more than one or more thresholds may cause violation, or non-satisfaction, of one or more of the various constraints described herein, including the containment constraints, stability constraints, and/or stress constraints. In additional examples, such shifts or movements of the actual poses away from or outside of the determined placement poses by more than one or more thresholds may prevent packing of remaining items in the container while still satisfying the various constraints described herein for one or more of such remaining items.

If the actual poses of the packed items are not within one or more thresholds of the determined placement poses for the items, the process 500 may continue with performing the pack planning process for the remaining items of the pack plan, and based on the estimated poses of the packed items, as at 516. For example, it may be determined that no additional items may be packed according to the pack plan based on the actual poses of the packed items, and/or based on potential violation of one or more of the various constraints described herein as a result of shifts or movements of the actual poses of packed items relative to the determined placement poses. As a result, a new pack plan, including a new placement sequence, new placement heuristic, and/or new placement poses, for the remaining items to be packed into one or more containers may be generated, e.g., substantially according to the example process shown and described with respect to FIG. 4. Further, a controller may instruct generation of a new pack plan for remaining items to be packed into one or more containers. The process 500 may then return to step 502 to pick an item to pack based on the new pack plan, and continue with packing the remaining items into one or more containers according to the new pack plan.

If, however, the actual poses of the packed items are within one or more thresholds of the determined placement poses for the items, the process 500 may proceed with determining whether there are additional items to pack, as at 512. For example, the pack plan may include a plurality of items to be packed into one or more containers. If there are additional items to pack according to the pack plan, a next item according to the pack plan may be selected for picking and placement within the one or more containers. Further, a controller may determine whether there are additional items to pack based on the pack plan.

The process 500 may then continue by picking the next item to pack based on the pack plan, as at 514. For example, a robotic arm and associated end effector, other automated robotic device, or other agent may pick a next item to pack according to the generated pack plan. As described herein, one or more imaging sensors or devices may assist in autonomous or automatic picking of the items by a robotic arm and end effector. Further, a controller may instruct a robotic arm and end effector to pick the item to pack based on the pack plan. The process 500 may then return to step 504 to pack the next item at the determined placement pose in the container according to the pack plan as described herein.

If it is determined that there are no additional items to pack according to the pack plan, the process 500 may end, as at 518. For example, if there are no additional items to pack, it may be determined that all of the plurality of items, e.g., items associated with a group, order, or other aggregation, to be packed into one or more containers have been successfully packed at respective placement poses according to the pack plan, while also ensuring that all items have been packed while satisfying the various constraints described herein, including the containment constraints, stability constraints, and/or stress constraints.

By detecting and processing sensor data of packed items during packing of containers according to a pack plan, actual poses of packed items may be compared with determined placement poses for the items in real-time during packing of individual items. In this manner, correct packing of items according to a pack plan may be verified. Upon identifying a significant deviation from the determined placement poses, which may violate or cause non-satisfaction of one or more of the various constraints described herein, the robotic packing process may be paused to prevent damage, breakage, or other losses. Then, a new pack plan may be dynamically generated to replan packing of additional items into containers having one or more items, e.g., based on actual pose data and/or actual depthmaps associated with the partially packed containers. Alternatively or in addition, a new pack plan may be dynamically generated to plan packing of remaining items into one or more additional containers. This real-time and dynamic modification and generation of pack plans for a plurality of items during the robotic packing process may further enable generation of more reliable and efficient pack plans that facilitate robotic or automated packing process while also reducing potential damage, breakage, or losses.

In some example embodiments, a pack plan may be generated based on a known or expected picking sequence of a plurality of items to be packed. For example, an order or sequence of availability or arrival of the plurality of items at the robotic packing subsystem may be known, expected, or predetermined. Then, a placement sequence for the pack plan may be selected or determined to be substantially similar to the expected sequence of availability or arrival of the items at the robotic packing subsystem.

In other example embodiments, the placement sequence for the pack plan may or may not be selected or determined based on the expected sequence of availability or arrival of the items at the robotic packing subsystem. Then, in situations in which items arrive at the robotic packing subsystem in a different sequence than the determined placement sequence, the robotic packing subsystem may place items that arrive out of sequence in a buffer or storage area, such that items may be packed according to the determined placement sequence irrespective of a particular sequence of arrival of the items to the robotic packing subsystem.

In further example embodiments, in situations in which items arrive at the robotic packing subsystem in a different sequence than the determined placement sequence, the robotic packing subsystem may pause packing of items according to the pack plan. Then, the pack planning subsystem may generate a new pack plan based on the particular sequence of arrival of the items to the robotic packing subsystem. In this manner, the pack planning subsystem may dynamically generate a new pack plan that substantially follows the particular sequence of arrival of the items to the robotic packing subsystem.

In still further example embodiments, the pack planning subsystem, the robotic packing subsystem, and/or a controller associated with or in communication with one or both of these subsystems may instruct picking and transport of items to the robotic packing subsystem based on a generated pack plan and associated placement sequence. Thus, the pack plan may be generated with a desired placement sequence, and upstream picking subsystems, operations, or functions may be instructed, modified, or changed such that the items arrive at the robotic packing subsystem according to the desired placement sequence.

Various other modifications or changes to interactions or communications between the item identification subsystem, the pack planning subsystem, the robotic packing subsystem, and/or various upstream or downstream subsystems, operations, or processes may be implemented to facilitate the substantially autonomous packing of items according to generated pack plans as described herein.

Figure 6:
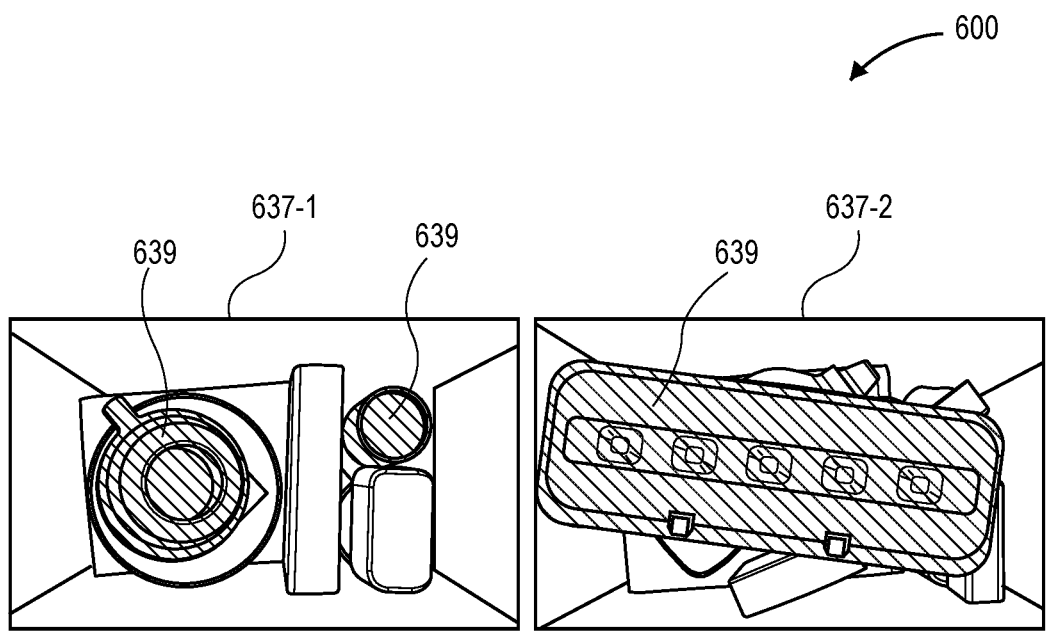
FIG. 6 are schematic diagrams of example containers that have been packed by an autonomous robotic pack planning system, in accordance with implementations of the present disclosure.

FIG. 6 are schematic diagrams 600 of example containers that have been packed by an autonomous robotic pack planning system, in accordance with implementations of the present disclosure.

As shown in FIG. 6, a plurality of containers 637-1, 637-2 may have been autonomously packed by a robotic packing subsystem according to one or more pack plans, including respective placement sequences and respective placement poses for the items. Each of the containers 637 may have been packed according to pack plans that take into account the containment constraints, stability constraints, and/or stress constraints as described herein.

With respect to the containment constraints, the packed items in each of the containers 637 may be positioned within the container, may be positioned without collisions or interferences with other items in the container, and may be positioned such that an agent, e.g., a robotic arm and end effector, may place the items at the determined placement poses without collisions or interferences with portions of the container and/or other items in the container.

With respect to the stability constraints, the packed items in each of the containers 637 may be positioned in stable positions. For example, the items may have been positioned and settled in stable, final positions using a physics simulator. In addition, the items may be positioned such that they are in static or quasi-static equilibrium, including contact force equilibrium and torque equilibrium, e.g., according to linear or quadratic programming optimization methods.

With respect to the stress constraints, the packed items in each of the containers 637 may be positioned such that damage, breakage, or other losses to packed items is reduced, minimized, or prevented. For example, as shown in FIG. 6, the items 639 illustrated with cross-hatching may comprise items having an item attribute of fragile, e.g., eggs, loaves of bread, bakery items, glasses, dishes, various fruits or vegetables, chips, snacks, or other crushable, breakable, or fragile items, as opposed to other items that may have an item attribute of standard, or not fragile. In some example embodiments, items 639 that are fragile may not have any other items packed on top of them. Thus, as shown in FIG. 6, each of the items 639 is positioned at placement poses without any other items positioned on top of the items 639.

In other example embodiments, items may have various different attributes associated with stress or fragility, which may include one or more maximum weight thresholds, maximum stress thresholds, maximum force thresholds, local stress thresholds, or other related thresholds. Then, the placement poses for the plurality of items in containers 637 may be determined or selected such that none of the various stress or fragility thresholds associated with various items within the containers 637 is exceeded by placement poses of respective items according to the pack plan.

As described herein, by generating pack plans that take into account containment constraints, stability constraints, and/or stress constraints, a plurality of items may be substantially automatically packed into one or more containers in a more reliable and efficient manner, while reducing, minimizing, or preventing damage, breakage, or other losses.

Figure 7:
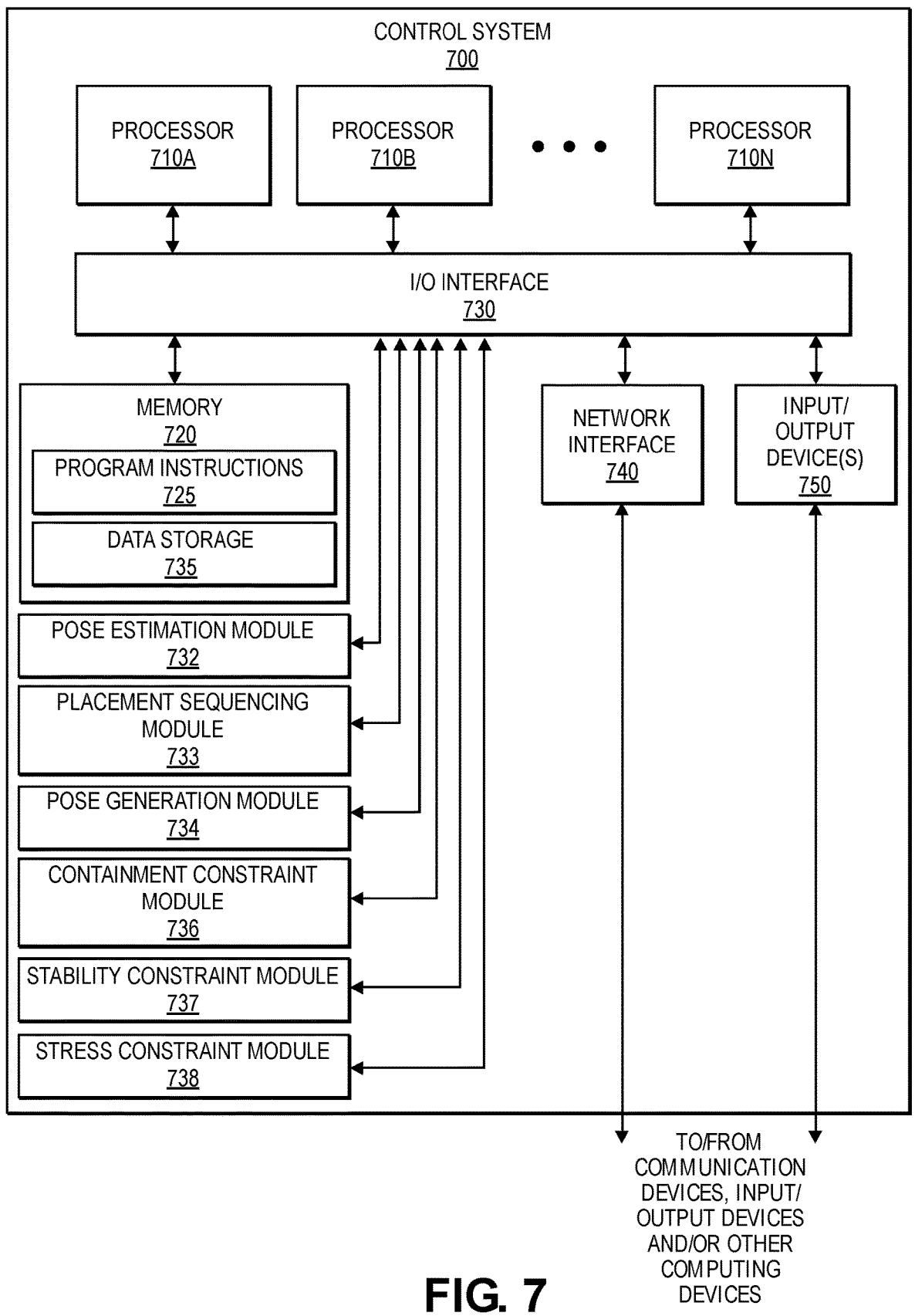
FIG. 7 is a block diagram illustrating various components of an example control system, in accordance with implementations of the present disclosure.

FIG. 7 is a block diagram illustrating various components of an example control system 700, in accordance with implementations of the present disclosure.

Various operations of a control system or controller, such as those described herein, may be executed on one or more computer systems, and/or interacting with various other computers, systems, or devices in a material handling facility, according to various implementations. For example, the control system or controller discussed above may function and operate on one or more computer systems. One such control system is illustrated by the block diagram in FIG. 7.

In the illustrated implementation, a control system 700 includes one or more processors 710A, 710B through 710N, coupled to a non-transitory computer-readable storage medium 720 via an input/output (I/O) interface 730. The control system 700 further includes a network interface 740 coupled to the I/O interface 730, and one or more input/output devices 750. In some implementations, it is contemplated that a described implementation may be implemented using a single instance of the control system 700 while, in other implementations, multiple such systems or multiple nodes making up the control system 700 may be configured to host different portions or instances of the described implementations. For example, in one implementation, some data sources or services (e.g., related to portions of autonomous robotic pack planning systems, operations, or processes, etc.) may be implemented via one or more nodes of the control system 700 that are distinct from those nodes implementing other data sources or services (e.g., related to other portions of autonomous robotic pack planning systems, operations, or processes, etc.).

In various implementations, the control system 700 may be a uniprocessor system including one processor 710A, or a multiprocessor system including several processors 710A-710N (e.g., two, four, eight, or another suitable number). The processors 710A-710N may be any suitable processor capable of executing instructions. For example, in various implementations, the processors 710A-710N may be general-purpose or embedded processors implementing any of a variety of instruction set architectures (ISAs), such as the x86, PowerPC, SPARC, or MIPS ISAs, or any other suitable ISA. In multiprocessor systems, each of the processors 710A-710N may commonly, but not necessarily, implement the same ISA.

The non-transitory computer-readable storage medium 720 may be configured to store executable instructions and/or data accessible by the one or more processors 710A-710N. In various implementations, the non-transitory computer-readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 720 as program instructions 725 and data storage 735, respectively. In other implementations, program instructions and/or data may be received, sent or stored upon different types of computer-accessible media, such as non-transitory media, or on similar media separate from the non-transitory computer-readable storage medium 720 or the control system 700. Generally speaking, a non-transitory, computer-readable storage medium may include storage media or memory media such as magnetic or optical media, e.g., disk or CD/DVD-ROM, coupled to the control system 700 via the I/O interface 730. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 740.

In one implementation, the I/O interface 730 may be configured to coordinate I/O traffic between the processors 710A-710N, the non-transitory computer-readable storage medium 720, and any peripheral devices, including the network interface 740 or other peripheral interfaces, such as input/output devices 750. In some implementations, the I/O interface 730 may perform any necessary protocol, timing or other data transformations to convert data signals from one component (e.g., non-transitory computer-readable storage medium 720) into a format suitable for use by another component (e.g., processors 710A-710N). In some implementations, the I/O interface 730 may include support for devices attached through various types of peripheral buses, such as a variant of the Peripheral Component Interconnect (PCI) bus standard or the Universal Serial Bus (USB) standard, for example. In some implementations, the function of the I/O interface 730 may be split into two or more separate components, such as a north bridge and a south bridge, for example. Also, in some implementations, some or all of the functionality of the I/O interface 730, such as an interface to the non-transitory computer-readable storage medium 720, may be incorporated directly into the processors 710A-710N.

The network interface 740 may be configured to allow data to be exchanged between the control system 700 and other devices attached to a network, such as other control systems, material handling system controllers, warehouse management systems, conveyance equipment or systems, other computer systems, robotic arms, machines, or systems, various types of sensors, various types of vision systems, imaging or scanning devices or sensors, upstream stations or processes, downstream stations or processes, other material handling systems or equipment, or between nodes of the control system 700. In various implementations, the network interface 740 may support communication via wired or wireless general data networks, such as any suitable type of Ethernet network.

Input/output devices 750 may, in some implementations, include one or more displays, monitors, projection devices, touchscreens, other visual input/output devices, microphones, speakers, other audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 700. Multiple input/output devices 750 may be present in the control system 700 or may be distributed on various nodes of the control system 700. In some implementations, similar input/output devices may be separate from the control system 700 and may interact with one or more nodes of the control system 700 through a wired or wireless connection, such as over the network interface 740.

As shown in FIG. 7, the memory 720 may include program instructions 725 that may be configured to implement one or more of the described implementations and/or provide data storage 735, which may comprise various tables, data stores and/or other data structures accessible by the program instructions 725. The program instructions 725 may include and/or be in communication with various executable instructions, programs, modules, or applications, such as a pose estimation module 732, a placement sequencing module 733, a pose generation module 734, a containment constraint module 736, a stability constraint module 737, and/or a stress constraint module 738. In this regard, the program instructions 725 may facilitate autonomous robotic pack planning operations and processes described herein, such as item identification, item pose estimation, item bounding box generation, item model generation, placement sequence determination, placement heuristic selection, candidate placement pose generation, candidate placement pose analysis, containment constraint processing, stability constraint processing, stress constraint processing, and/or various other operations or processes.

In addition, the program instructions 725 may facilitate additional autonomous robotic pack planning operations and processes described herein, and may include and/or be in communication with various executable instructions, programs, modules, or applications, such as robotic arm, machine, or apparatus controllers, drivers, or applications, end effector controllers, drivers, or applications, actuator controllers, drivers, or applications, sensor controllers, drivers, or applications, sensor data processing applications, imaging or scanning device controllers, drivers, or applications, imaging data processing applications, material handling or conveyance equipment controllers, drivers, or applications, upstream station controllers, drivers, or applications, downstream station controllers, drivers, or applications, etc.

The data storage 735 may include various data stores for maintaining data related to systems, operations, or processes described herein, such as robotic arms, machines, or apparatus, end effectors, actuators, sensors, sensor data, imaging or scanning devices, imaging data, containers, container data, items, item attribute data, item pose data, item bounding boxes or models, pack plans, placement sequences, placement heuristics or rules, candidate placement poses, containment constraints, stability constraints, stress constraints, material handling or conveyance equipment or apparatus, upstream systems, stations, or processes, downstream systems, stations, or processes, etc.

Those skilled in the art will appreciate that the control system 700 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 700 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 3-5, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
    identifying, by a controller, a plurality of items to be packed into one or more containers;
    receiving, by the controller, item attributes associated with respective items of the plurality of items, the item attributes including size, weight, stability, and fragility associated with respective items;
    determining, by the controller, a placement sequence for the plurality of items based on the item attributes associated with respective items;
    receiving, by the controller, a placement heuristic for packing of the plurality of items into one or more containers;
    generating, by the controller, a pack plan for the plurality of items, wherein generating the pack plan includes for each item of the plurality of items:
        selecting, by the controller, an item based on the placement sequence;
        receiving, by the controller, a three-dimensional model of the item;
        determining, by the controller, a placement pose for the item in a container based on the placement heuristic;
        verifying, by the controller, that the placement pose for the item satisfies one or more containment constraints;
        verifying, by the controller, that the placement pose for the item satisfies a stability constraint;
        verifying, by the controller, that the placement pose for the item satisfies a fragility constraint, wherein the fragility constraint comprises the placement pose of the item being positioned such that any local stress of the item is less than a respective local fragility threshold associated with another item positioned under the item; and
        updating, by the controller, the pack plan including the placement pose for the item; and
    instructing, by the controller, packing of the plurality of items into one or more containers based on the pack plan.

2. The computer-implemented method of claim 1, wherein the one or more containment constraints comprise at least one of:
    the placement pose of the item being positioned within an interior of the container;
    the placement pose of the item being positioned without interference with one or more other items in the container; or
    the placement pose of the item being positioned to enable placement of the item in the container by an agent.

3. The computer-implemented method of claim 1, wherein the stability constraint comprises the placement pose of the item being in static equilibrium based on analysis by at least one of a physics simulator, linear programming optimization, or quadratic programming optimization.

4. The computer-implemented method of claim 1, wherein the fragility constraint further comprises at least one of:
    the placement pose of the item being positioned such that the item is not positioned upon another item having an item attribute of fragile;
    the placement pose of the item being positioned such that a weight of the item is less than a maximum fragility threshold associated with another item positioned under the item;
    the placement pose of the item being positioned such that a sum of contact forces of the item is less than a maximum fragility threshold associated with another item positioned under the item; or
    the placement pose of the item being positioned such that any individual contact force of the item is less than a maximum fragility threshold associated with another item positioned under the item.

5. A method, comprising:
    determining, by a controller, a placement sequence for a plurality of items to be packed into a container;
    generating, by the controller, a pack plan for the plurality of items, wherein generating the pack plan includes for individual items of the plurality of items:
        selecting, by the controller, an item based on the placement sequence;
        determining, by the controller, a placement pose for the item in the container;
        determining, by the controller, whether the placement pose for the item satisfies a stress constraint, wherein the stress constraint comprises the placement pose of the item being positioned such that any local stress of the item is less than a respective local stress threshold associated with another item positioned under or in contact with the item; and
        in response to determining that the placement pose for the item satisfies the stress constraint:
            updating, by the controller, the pack plan including the placement pose for the item; and
    instructing, by the controller, packing of the plurality of items into the container based on the pack plan.

6. The method of claim 5, further comprising:
    identifying, by the controller, the plurality of items to be packed into the container; and
    receiving, by the controller, item attributes associated with respective items of the plurality of items, the item attributes including size, weight, stability, and fragility associated with respective items;

wherein the placement sequence is determined based on the item attributes associated with respective items.

7. The method of claim 5, further comprising:
determining, by the controller, that the placement pose for the item satisfies one or more containment constraints.

8. The method of claim 5, further comprising:
receiving, by the controller, a placement heuristic for packing of the plurality of items into the container;
wherein the placement pose is determined based on the placement heuristic.

9. The method of claim 5, wherein the stress constraint further comprises the placement pose of the item being positioned to apply a force below a respective threshold of another item within the container based on analysis by at least one of linear programming optimization or quadratic programming optimization.

10. The method of claim 9, wherein the stress constraint further comprises at least one of:
the placement pose of the item being positioned such that the item is not positioned upon another item having an item attribute of fragile; or
the placement pose of the item being positioned such that at least one of a weight of the item, a sum of contact forces of the item, or any individual contact force of the item is less than a maximum stress threshold associated with another item positioned under or in contact with the item.

11. The method of claim 5, wherein instructing packing of the plurality of items into the container based on the pack plan further comprises:
receiving, by the controller, pose data associated with an item that is packed into the container based on the pack plan;
determining, by the controller, whether the pose data associated with the item corresponds within a threshold to the placement pose of the item based on the pack plan; and
in response to determining that the pose data associated with the item corresponds within the threshold to the placement pose of the item based on the pack plan:
instructing, by the controller, packing of another item of the plurality of items into the container based on the pack plan.

12. The method of claim 11, wherein instructing packing of the plurality of items into the container based on the pack plan further comprises:
in response to determining that the pose data associated with the item does not correspond within the threshold to the placement pose of the item based on the pack plan:
determining, by the controller, a new placement sequence for remaining items of the plurality of items to be packed into the container;
generating, by the controller, a new pack plan for the remaining items based at least in part on the new placement sequence and the pose data associated with the item; and
instructing, by the controller, packing of the remaining items into the container based on the new pack plan.

13. The method of claim 5, wherein generating the pack plan further includes for individual items of the plurality of items:
determining, by the controller, whether the placement pose for the item satisfies a stability constraint, wherein the stability constraint comprises the placement pose of the item being in static equilibrium based on analysis by at least one of a physics simulator, linear programming optimization, or quadratic programming optimization.

14. The method of claim 13, wherein the stability constraint further comprises the placement pose of the item being associated with at least one of a contact force equilibrium or a torque equilibrium.

15. The method of claim 13, wherein generating the pack plan further includes for individual items of the plurality of items:
in response to determining that the placement pose for the item does not satisfy at least one of the stability constraint or the stress constraint:
determining, by the controller, a second placement pose for the item in a second container;
determining, by the controller, that the second placement pose for the item in the second container satisfies at least one of the stability constraint or the stress constraint; and
updating, by the controller, the pack plan including the second placement pose for the item in the second container.

16. The method of claim 13, wherein generating the pack plan further includes for individual items of the plurality of items:
in response to determining that the placement pose for the item does not satisfy at least one of the stability constraint or the stress constraint:
determining, by the controller, a second placement sequence for the plurality of items to be packed into the container; and
generating, by the controller, a second pack plan for the plurality of items based on the second placement sequence.

17. A system, comprising:
an item identification subsystem configured to detect and identify a plurality of items to be packed into a container;
a pack planning subsystem configured to generate a pack plan for the plurality of items based on a placement sequence for the plurality of items, wherein the pack plan is generated such that respective placement poses of individual items of the plurality of items satisfy a stress constraint, wherein the stress constraint comprises the placement pose of the item being positioned such that any local stress of the item is less than a respective local stress threshold associated with another item positioned under or in contact with the item; and
a robotic packing subsystem configured to pack the plurality of items into the container based on the pack plan.

18. The system of claim 17, wherein the item identification subsystem comprises:
an imaging device configured to capture imaging data of the plurality of items; and
a controller configured to identify individual items of the plurality of items based on the imaging data.

19. The system of claim 17, wherein the pack planning subsystem comprises:
a controller configured to receive data associated with the plurality of items, determine the placement sequence for the plurality of items based on the data, and generate the pack plan including respective placement poses of individual items of the plurality of items based on the placement sequence.

20. The system of claim 17, wherein the robotic packing subsystem comprises:

a robotic arm configured to pack the plurality of items into the container;
a controller configured to instruct the robotic arm to pack the plurality of items based on the pack plan; and
an imaging device configured to capture pose data associated with packed items in the container;
wherein the controller is further configured to determine whether the pose data associated with packed items corresponds within a threshold to respective placement poses of individual items of the plurality of items.

* * * * *